(12) United States Patent
Rohde et al.

(10) Patent No.: US 7,976,243 B2
(45) Date of Patent: Jul. 12, 2011

(54) METHODS AND APPARATUS FOR INSTALLING CONDUIT UNDERGROUND

(75) Inventors: Joseph M. Rohde, Saginaw, MI (US); Richard A. Rohde, Saginaw, MI (US); Robert L. Gilling, Auburn Hills, MI (US); James R. Heim, Auburn Hills, MI (US); Michael J. Kenny, Auburn Hills, MI (US); Thomas A. Kenny, Auburn Hills, MI (US)

(73) Assignee: Green Core Technologies, LLC, Auburn Hills, MI (US)

( * ) Notice: Subject to any disclaimer, the term of this patent is extended or adjusted under 35 U.S.C. 154(b) by 915 days.

(21) Appl. No.: 11/811,591

(22) Filed: Jun. 11, 2007

(65) Prior Publication Data

US 2008/0124178 A1 May 29, 2008

Related U.S. Application Data

(60) Provisional application No. 60/813,889, filed on Jun. 15, 2006, provisional application No. 60/905,742, filed on Mar. 8, 2007.

(51) Int. Cl.
*E02F 5/10* (2006.01)
(52) U.S. Cl. ........................... 405/184; 405/174
(58) Field of Classification Search ............... 405/154.1, 405/174, 184; 175/62
See application file for complete search history.

(56) References Cited

U.S. PATENT DOCUMENTS

| | | | |
|---|---|---|---|
| 1,685,619 A | 9/1928 | Welsh | |
| 2,650,664 A | 9/1953 | Sorensen | |
| 2,736,384 A | 2/1956 | Potts | |
| 2,950,929 A | 8/1960 | Nicolson | |
| 3,208,381 A | 9/1965 | Kihlstrom et al. | |
| 3,359,742 A * | 12/1967 | Blatter | 405/259.5 |
| 3,753,471 A | 8/1973 | Kammerer, Jr. et al. | |
| 3,777,987 A | 12/1973 | Allport | |
| 3,827,258 A | 8/1974 | Kammerer, Jr. et al. | |
| 4,430,021 A | 2/1984 | Wagner et al. | |
| 4,445,572 A * | 5/1984 | Fineberg et al. | 166/188 |
| 4,526,230 A | 7/1985 | Kojicic | |

(Continued)

FOREIGN PATENT DOCUMENTS

EP 291193 A1 * 11/1988

OTHER PUBLICATIONS

The Driving Force, 3$^{rd}$ Quarter 2000, 2 pgs Manta Ray/Sting Training Program Jul. 26, 27, 28, 2000.

(Continued)

*Primary Examiner* — Tara Mayo-Pinnock
*Assistant Examiner* — Benjamin Fiorello
(74) *Attorney, Agent, or Firm* — Currie Kendall PLC; Bruce M Kanuch (57) ABSTRACT

Apparatus and methods for forming an underground passageway and simultaneously laying therein a conduit or other elongate components comprises a rotary drill member coupled to a rotary and axially movable drill stem. The coupling is one which virtually automatically enables the drill stem to be coupled to and uncoupled from the drill member and comprises interlocking driving lugs carried by the drill stem and the drill member. The driving lugs are sandwiched between telescoped portions of the drill member and the drill stem and thereby are reinforced by such portions of the drill stem and the drill member in such manner as to preclude movement of the driving lugs in both radially inward and radially outward directions.

6 Claims, 7 Drawing Sheets

U.S. PATENT DOCUMENTS

| | | | |
|---|---|---|---|
| 4,543,013 | A | 9/1985 | Wagner et al. |
| 4,611,662 | A | 9/1986 | Harrington |
| 4,649,996 | A | 3/1987 | Kojicic et al. |
| 4,679,637 | A | 7/1987 | Cherrington et al. |
| 4,697,952 | A * | 10/1987 | Maddock .................. 405/43 |
| 4,784,230 | A | 11/1988 | Cherrington et al. |
| 5,180,251 | A | 1/1993 | Paurat et al. |
| 5,197,824 | A | 3/1993 | Paurat et al. |
| 5,199,816 | A | 4/1993 | Paurat et al. |
| 5,209,605 | A | 5/1993 | Cherrington |
| 5,421,672 | A | 6/1995 | Ankeny et al. |
| 5,551,797 | A | 9/1996 | Sanford |
| 5,595,652 | A | 1/1997 | Rainer |
| 5,642,781 | A | 7/1997 | Richard |
| 5,839,524 | A | 11/1998 | Sanford |
| 6,073,659 | A | 6/2000 | Lange |
| 6,082,932 | A | 7/2000 | Anderson |
| 6,202,763 | B1 | 3/2001 | Gude et al. |
| 6,315,043 | B1 | 11/2001 | Farrant et al. |
| 6,464,003 | B2 | 10/2002 | Bloom et al. |
| 6,478,092 | B2 | 11/2002 | Voll et al. |
| 6,561,732 | B1 | 5/2003 | Bloomfield et al. |
| 6,640,894 | B2 | 11/2003 | Bloom et al. |
| 6,651,747 | B2 | 11/2003 | Chen et al. |
| 6,715,544 | B2 | 4/2004 | Gillespie et al. |
| 6,994,170 | B2 | 2/2006 | Echols |
| 7,063,164 | B2 | 6/2006 | Hilsman et al. |
| 7,165,913 | B2 | 1/2007 | Allard et al. |
| 2005/0063782 | A1 | 3/2005 | Stoecker et al. |
| 2005/0082055 | A1 | 4/2005 | Bloom et al. |
| 2006/0137883 | A1 | 6/2006 | Kluger et al. |
| 2006/0157256 | A1 | 7/2006 | Hopkins et al. |
| 2007/0017670 | A1 | 1/2007 | Bloom et al. |

OTHER PUBLICATIONS

Directed Technologies Drilling Incorporated (DTD) Directional Drilling Mar. 14, 2006, 2 pgs, Directed Technologies Drilling Incorporated (DTD) Groundwater Extraction, Mar. 14, 2006, 2 pgs.

Michigan Contractor & Builder, Jun. 3, 2006 Holland's New Water Main, by Dirk C. Bloemendaal, 3 pgs; Michigan Contractor & Builder, Jun. 3, 2006 Conduit Placed, by Aram kalousdian, 1 pg.

Michigan Contractor & Builder, Jun. 3, 2006, Weathering the Storm, Tara Deering, 2 pgs; Michigan Contractor & Builder, Jun. 3, 2006, Underground Construction, Neil Smith, 2 pgs.

Michigan Contractor & Builder, Jun. 3, 2006 Trenchless Underground Products, 2 pgs.

ConstructionEquipmentGuide.com, Jun. 3, 2006, NC Contractor Excited About Boring Project, Tara Deering, 4 pgs.

Oxford Plastics Inc., Ontario, Canada, Jun. 3, 2006, HDPE Pressure Pipe, 2 pgs ; Oxford Plastics Inc., Ontario, Canada, Jun. 3, 2006, Horizontal Directional Drilling, 1 pgs.

vermeermfg.com, Jun. 3, 2006, Horizontal Directional Drills and Directional Drilling Units, 2 pgs.

Melfred Borzall, Inc. copyright 2005, Directional Depot, Jun. 8, 2006, Nothing Bors Like a Borzall, 5 pgs.

* cited by examiner

METHODS AND APPARATUS FOR INSTALLING CONDUIT UNDERGROUND

CROSS REFERENCE TO RELATED APPLICATIONS

This application claims the benefit of the filing date of U.S. Provisional Applications Nos. 60/813,889, filed Jun. 15, 2006; and 60/905,742, filed Mar. 8, 2007.

This invention relates to methods and apparatus for forming an underground passageway and simultaneously installing in such passageway cables and/or one or more conduits through which fluid may pass either into or out of such conduit.

BACKGROUND OF THE INVENTION

It is conventional to provide a substantially horizontal, underground passageway for the accommodation of a conduit having a cylindrical wall provided with openings through which fluids such as water or other liquids may pass to enable earth above the passageway to be dewatered or drained. Examples of apparatus for accomplishing this objective are disclosed in Wagner et al U.S. Pat. No. 4,543,013, issued Sep. 24, 1985 and Cherrington et al U.S. Pat. No. 4,679,637 issued Jul. 14, 1987.

It also is conventional to install in an underground passageway, after the formation thereof, a conduit composed of a plurality of pipe sections at least some of which have a wall provided with openings through which water or other fluids may pass. Examples of such conduit-forming pipe sections are disclosed in Lange U.S. Pat. No. 6,073,659 issued Jun. 13, 2000 and Bloomfield et al U.S. Pat. No. 6,561,732 issued May 13, 2003.

The disclosures of the above identified patents are incorporated herein by reference.

The underground passageway conventionally is formed by a drill member secured at one end of a rotatable drill stem composed of a string of tubular rod sections joined to one another in such manner as to enable all of such sections and the drill member to be rotated simultaneously and moved linearly in a direction to form the underground passageway. Following forming of the passageway the drill member conventionally will occupy an accessible position enabling it to be removed from the drill stem and the drill stem then to be coupled to a reamer which can be drawn rearwardly through the passageway so as to enlarge the passageway. The reamer may be coupled to one end of a string of conduit-forming pipe sections which will be drawn through the reamed passageway in response to rearward movement of the drill stem and reamer. When the pipe string reaches the point at which the forming of the passageway commenced, it may be detached from the drill stem and coupled to a pump so as to enable whatever liquid is in the underground conduit to be withdrawn therefrom. In this manner a swampy area above the conduit may be drained. Further, contamination which may result from the discharge of toxic materials to land areas may be drained from such areas. In addition, fluids containing bioremedial substances may be pumped into the conduit and discharged through the openings thereof into the area encircling the conduit so as to detoxify such area.

There are several objectionable characteristics of the conventional apparatus referred to above. Among them are the necessity of making at least two passes underground, one of which is in the initial formation of the passageway and the other of which is the reaming of the passageway to an appropriate size to accommodate conduit and installing the conduit. Another objectionable characteristic is the difficulty of disconnecting the drill stem from the drill member or other device rotated by the drill stem, including in some instances the necessity of extending the drill member to the surface or excavating a pit to obtain access to the drill member in its underground position. A further objectionable characteristic of conventional apparatus is that the openings in the conduit may not be of such size as to accommodate fluids of different viscosities with optimum flow rates.

A principal object of the invention is to provide methods and apparatus which overcome the objections referred to above.

SUMMARY OF THE INVENTION

Apparatus constructed in accordance with the preferred embodiments of the invention utilizes conventional apparatus for moving a passageway-forming member through earth in a selected direction and at a selected underground depth to form a passageway of sufficient diameter to enable one or more conduits and/or other elongate components to be installed in the passageway simultaneously with the formation of the latter. The passageway-forming member may comprise either a drill member or a reamer member. Accordingly, reference hereinafter to a drill member is intended to include not only a drill member, but any other device that will form an underground passageway. Each conduit may comprise a plurality of pipe sections joined end-to-end as is conventional.

A drill member suitable for use in practicing the invention has at its leading end a directional control and a drilling bit or blade of the kind which frequently is referred to as a Duckbill. The blade is fixed to the body of the drill member in such manner as to project both longitudinally and laterally beyond the body so that conjoint rotation of the body and drill blade enables an underground bore or passageway to be formed, the passageway having a diameter sufficiently greater than that of the body of the drill member as to accommodate one or more conduits or other elongate components.

The trailing end of the drill member is adapted for releasable attachment to the leading drill stem section. Such drill stem section also may have slots or openings through which cooling water or drilling mud may pass, and the drill member body has similar slots or openings for the same purpose.

A sonde of conventional construction is installed in a drill stem section at or near the leading end of the drill stem and is removably coupled to the drill member at or near its trailing end. The sonde reacts in known manner with above-ground apparatus to enable personnel to know at all times the position of the drill member. The trailing end of the sonde-containing drill stem section is pinned or otherwise suitably secured to the next adjacent trailing section of the drill stem.

The coupling between the drill stem and the drill member is one in which the drill stem easily and virtually automatically may be coupled to and uncoupled from the drill member. Such coupling also is one which ensures a secure connection between the drill stem and the drill member for effecting rotation and reciprocable linear movements of the latter.

The body of the drill member is provided between its ends with an external, rotatable collar having one or more brackets each of which projects radially outwardly for attachment to the leading end of a conduit composed of a plurality of joined pipe sections at least some of which may have openings therein for the passage of fluid. The leading end of one or more elongate cables may be connected to the collar in lieu of or in addition to the conduit so as to be laid in the passageway as it is formed by the drill member.

Instead of a collar having radially projecting brackets for the attachment of conduit, the drill member body may support a puller which is secured to the drill member in such manner as to clamp the leading end of a conduit that encircles and is coaxial with the drill stem. The drill stem is separably coupled to the drill member in the manner and for the purposes referred to earlier.

The conduit may be composed of multiple pipe sections or lengths joined end-to-end in a conventional, well known manner. Some or all of the pipe sections may be composed of inner and outer telescoped lengths each of which has a plurality of circumferentially and axially spaced openings therein which register with one another so as to form ports through the walls of the telescoped pipe sections. The telescoped sections may be adjusted relative to one another and then secured in the adjusted position so as to enable the overlying openings to form infinitely variable area ports. The selected positions of the overlying openings may be preset or determined by one or more gauges.

The leading end of the drill member may be thrust into the ground at a selected site, as is conventional, and coupled to the drill stem which is rotated and pushed in a conventional manner into the ground until the drill member reaches the desired depth, as may be determined by the sonde, as also is conventional. Thereafter, the drill member may be positioned via the cutting blade in known manner so as to be oriented in a selected direction for the drilling of an underground passageway which may be horizontal or otherwise. When the drill member has been advanced a distance sufficient to enable an additional drill stem section to be added to the adjacent preceding drill section, the additional section is added to the trailing end of the drill stem and the entire drill stem rotated and pushed to continue the formation of the underground passageway.

As the drill member proceeds forwardly, additional sections of conduit-forming pipe are attached to the trailing end of the preceding conduit sections so as to be installed in the underground passageway simultaneously with the movement of the drill member as it forms the passageway.

The sonde will enable the operators of the apparatus to know the precise location of the drill member at all times, thereby enabling selected sections of perforate or imperforate sections of conduit-forming pipe to be utilized as necessary or desirable.

When a sufficient number of conduit-forming pipe sections have been installed in the underground passageway to form a pipe string of desired length, the drill stem section in which the sonde is carried is disconnected from the drill member following which the drill stem (including the section containing the sonde) is withdrawn rearwardly from the passageway leaving the drill member and the installed conduit-forming pipe sections and/or cables in place in the passageway.

The apparatus and methods of the invention enable an underground passageway of desired length to be formed and, at the same time, one or more conduits and/or cables to be laid in the passageway. Since the rotary drill member which forms the passageway is connected to the conduits and/or cables, uncoupling of the drill member while the latter remains underground enables substantial economies and time savings to be realized.

On those occasions when the underground position of the drill member is desired or required to be fixed, restraining arms pivoted to the bushing referred to earlier may be moved radially outward and become embedded in the earth through which the passageway extends. Rearward and rotary movement of the drill member thus will be precluded.

THE DRAWINGS

Apparatus for use in performing the preferred method is illustrated in the accompanying drawings wherein.

THE PREFERRED EMBODIMENTS

Figure 1:
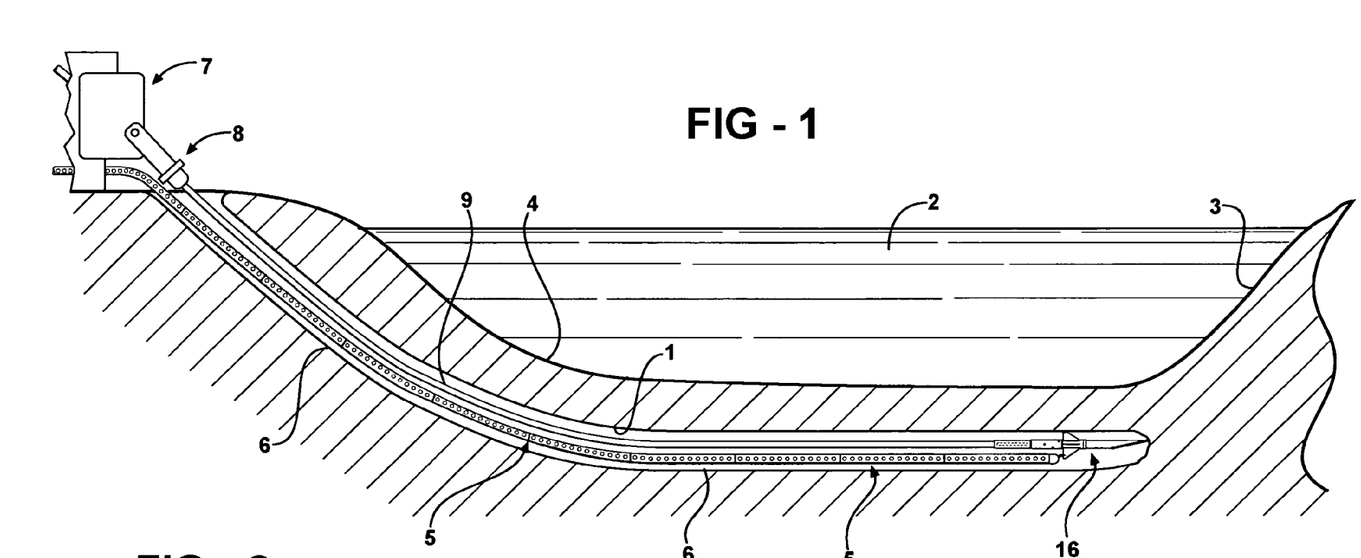
FIG. 1 is a diagrammatic, fragmentary view illustrating a length of conduit installed in an underground passageway which underlies a watery site to be drained.
Figure 2:
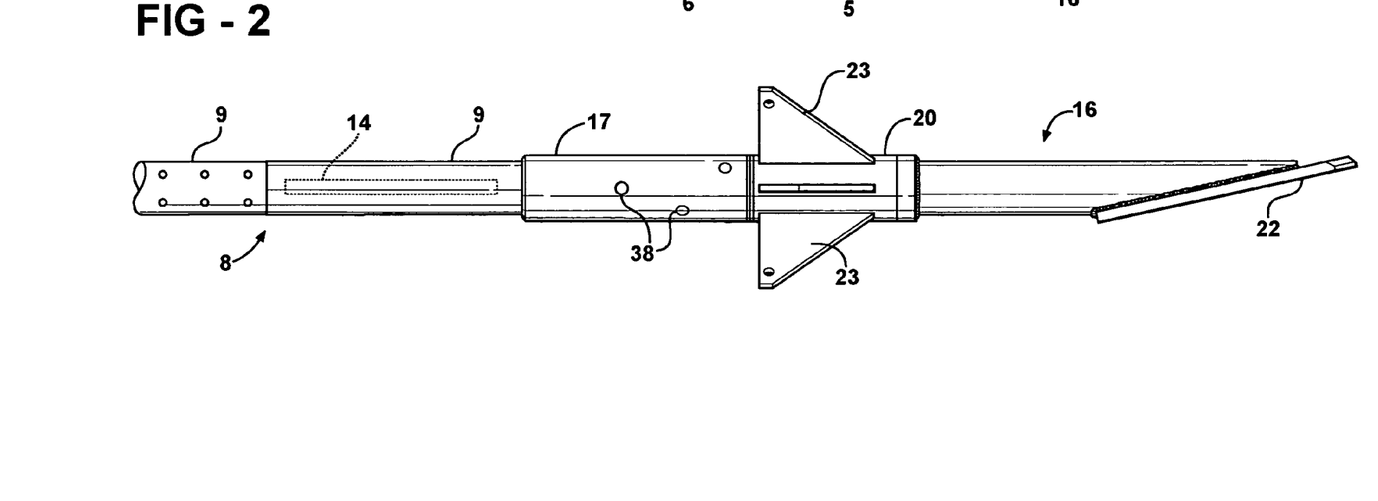
FIG. 2 is a fragmentary, elevational view on a greatly enlarged scale, of a drill member, the leading end of a drill stem, and the leading end of a conduit attached to the drill member.

Apparatus especially adapted for use in practicing the method according to the invention is capable of forming an underground passageway 1 through earth at a site at which water or other liquid 2 has collected and which is to be drained or otherwise treated. As illustrated in FIG. 1, the liquid 2 is contained in a pond having sides 3 and a bottom 4. The passageway 1 is formed by drilling apparatus described hereinafter and within which may be laid at least one conduit 5 formed by a plurality of pipe sections 6. Some of such pipe sections may be imperforate, whereas others may have perforations for purposes which will be explained shortly. Known apparatus for rotating and applying forward and rearward thrust on the drilling apparatus, as well as for pumping water or drilling mud through the drilling apparatus, is indicated generally at 7.

Drilling apparatus of the kind by which the conduit laying method may be performed comprises a drill stem 8 composed of a plurality of rod sections 9 pinned or otherwise joined end-to-end as is conventional so as to form a drill stem of desired length. The leading drill stem section 9 may have at its trailing end a threaded, forwardly tapering socket 10 (FIG. 3) and the leading end of the trailing adjacent drill stem section 9 may have a correspondingly threaded, forwardly projecting nose which is threadedly accommodated in the socket 10. Alternatively, each drill stem section may be pinned to its adjacent trailing section. Each drill stem section has a bore 12 through which water and/or drilling mud under pressure may flow, as is conventional.

The leading drill stem section 9 includes a sonde 14 and openings in communication with the bore 12 through which water and/or drilling mud may pass. The leading end of the leading drill stem section 9 has fixed therein a forwardly projecting, hollow extension 11 having a diameter less than that of the section 9. The extension 11 forms part of a separate coupling means which will be described in detail hereinafter and has on its periphery a plurality of sealing o-rings 13.

At the leading end of the drill stem 8 is a known drill member 16 of the kind provided by Melfred Borzall, Inc., of Santa Maria, Calif. The member 16 has a tubular body 17 whose diameter corresponds substantially to that of the drill stem sections 9. The body also has a bore 18 and appropriately placed openings, as is conventional, through which lubricating water and/or drilling mud may be forced through and outwardly of the body under pressure.

Between its ends the tubular drill member body 17 has a groove 20 which is encircled by a bushing or collar 21 rotatable relative to the body 17. At the leading end of the body 17 is a cutting bit or blade 22 commonly referred to as a Duckbill, which projects forwardly and is obliquely inclined from the longitudinal axis of the body 17 for rotation with the latter. The blade 22 is of such width that, when rotated and moved linearly through the earth, it will form the underground passageway 1 whose diameter is substantially greater than that of the drill stem diameter, as is shown in FIG. 1.

Figure 10:
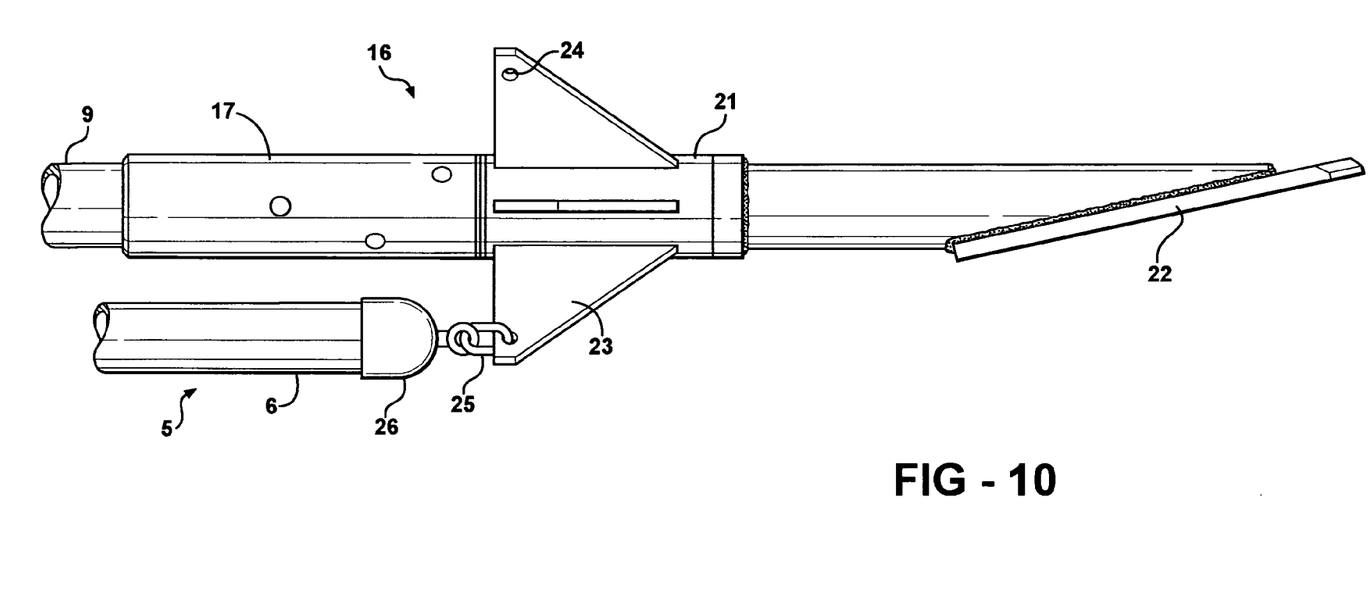
FIG. 10 is a view similar to FIG. 2 and illustrating another way of connecting a conduit to the drill member.

Secured to the collar 21 is at least one, and preferably several, circumferentially spaced, radially extending brackets 23 of selected radial length. Each bracket has an opening 24 therein. Also secured to a selected bracket via a link 25 (FIG. 10) is an end cap 26 of conventional construction and to which is fixed the leading section 6 of the conduit 5.

The collar 21 also may include a stone shield (not shown) of conventional construction upstream from the brackets 23 so as to provide some protection for the brackets, the attachments thereto, and the pipe string 5 which trail the drill member 16.

As mentioned earlier and as is indicated in FIG. 1, the conduit 5 is composed of a plurality of individual pipe sections 6 some of which may be perforated and others of which may be imperforate. In general, perforated pipe sections are used in those instances in which the conduit or pipe string underlies a site which requires drainage or other treatment, whereas imperforate pipe sections are used in those zones between site areas that do not require drainage or other treatment. For example, if an area has two low water collecting wet zones spaced by a higher level zone at which water does not collect, the conduit can be composed of perforated pipe sections underlying the wet zones for draining the latter, and such pipe sections may be spaced by imperforate pipe sections, thereby avoiding the necessity of perforating all of the pipe sections. The zones or positions at which the perforated and imperforate sections should be laid easily are determined by means of the sonde 14 and its related, above ground sensing means (not shown) in a conventional manner.

Figures 8, 9:
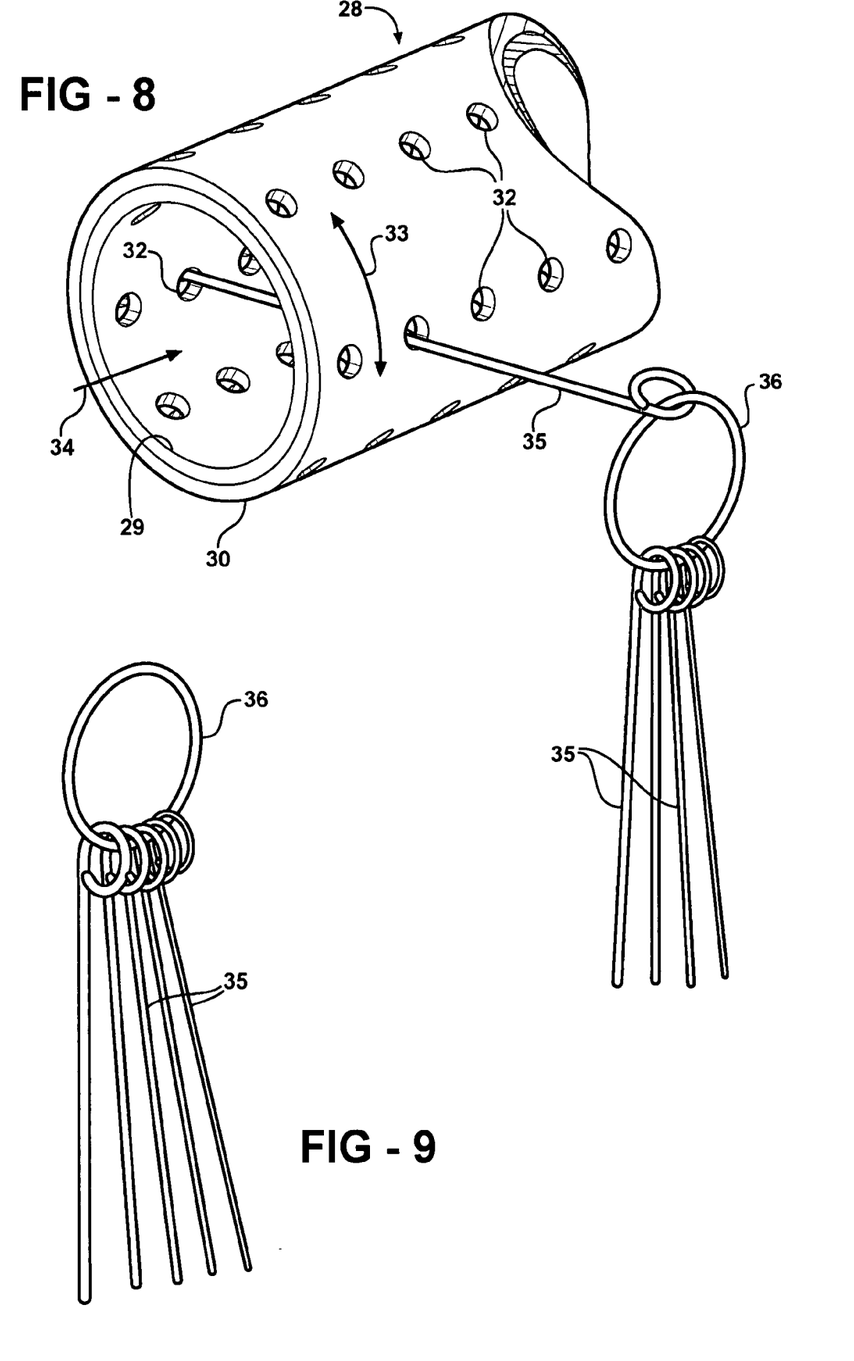
FIG. 8 is a fragmentary isometric view of a conduit having telescoping sections provided with registered openings and indicating how the relationship between the openings may be adjusted.
FIG. 9 is an isometric view of gauges for use in adjusting the relationship between the openings.

One embodiment of a perforated pipe section is shown at 28 in FIG. 8. This embodiment comprises two telescoped pipe sections 29 and 30, the pipe section 29 being within the section 30. Each pipe section is formed of conventional, somewhat flexible conduit-forming material having an annular wall 31 provided with a plurality of axially and circumferentially spaced openings 32 of substantially uniform diameter. If desired and appropriate, either pipe section can be used without being telescoped with the other.

As shown in FIG. 8 the pipe section 29 is accommodated in the pipe section 30. The inner section 29 has axially and circumferentially spaced openings and the section 30 has similar openings similarly arranged. The pipe section 30 snugly accommodates the section 29, but the two sections are relatively rotatable as indicated by the arrow 33 or axially adjustable as indicated by the arrow 34. The two pipe sections together form a single section of the conduit 5.

The diameters and positioning of the openings 32 are such that in one relative position of the two sections the openings are in register, thereby enabling the entire area of two registered openings to form a port which is fully open. If it is desired to reduce the open area, the sections may be assembled in predetermined, fixed adjusted positions. Alternatively, the sections may be relatively adjusted on site so as to vary the open area of the port. For on site adjustment a plurality of different diameter gauge pins 35 may be provided and supported on a ring 36. Any one of the pins may be thrust diametrally through opposed openings 32 of the assembled pipe sections, as shown in FIG. 8, and the latter adjusted as necessary to establish the desired open area of the ports. Following relative adjustment of the pipe sections the gauge may be withdrawn from the openings.

Before the pipe section 28 is joined to and included in the conduit string, the telescoped sections 29 and 30 are adjusted to a position in which the respective openings 32 are oriented to one another in desired manner. For example, confronting openings 32 may be coaxial in the radial direction or they may partially overlap one another. Since the diameters of the pipe sections 29 and 30 are different, the openings 32 in the inner section 29 will be of slightly less area than that of the openings in the pipe 30. When the inner and outer openings 32 are coaxial the port formed thereby will be of maximum area. When the pipe sections 29 and 30 are rotated or axially adjusted relative to one another to a different position, the inner and outer openings 32 will be offset from one another, thereby decreasing the area of the ports formed by overlying openings. Thus, the relative position of the pipe sections is infinitely adjustable to provide ports that are fully open or less than fully open. Following rotation of the two pipe sections to the desired extent they may be fixed by being fused, pinned, or otherwise fixed to one another in known manner.

In the laying of the conduit in the passageway, the drill member 16, as has been stated, is removably connected to the leading drill stem section 9 and the next adjacent trailing drill stem section is joined to the leading section 9. The leading conduit-forming pipe section 6 is coupled to a selected bracket 23 on the drill member 16 and the drill member is rotated and pushed via the drill stem so as to cause the cutting blade 22 to rotate and form a bore or passageway extending into the ground to a desired level, as determined by the above ground sensing apparatus associated with the sonde 14. Once the desired level of the drill member has been reached, its direction may be changed in known manner. The diameter of the passageway is sufficient to accommodate not only the drill member, but also the joined conduit-forming sections 6. As the boring of the passageway proceeds, additional drill stem sections are coupled together end-to-end, as necessary and conventional. The confronting ends of adjacent conduit pipe sections are joined to one another in known manner to form a conduit of desired length.

The drilling of the underground passageway and the simultaneous laying therein of the conduit will continue until the passageway and the conduit have reached the desired length. Throughout the passageway-forming process, water and/or drilling mud may be introduced through the drill stem, as is conventional, to provide cooling, lubrication, and support for the drill member, its associated parts, and the conduit.

When the passageway has been formed to the desired length, the drill member 16 may be uncoupled from the drill stem and left at the forward end of the passageway. However, the entire drill stem, including the section containing the sonde, may be removed from the passageway.

To enable the drill stem easily to be coupled to and uncoupled from the drill member, the coupling therebetween is one that is virtually automatic in effecting coupling and uncoupling the drill stem and the drill member. Such coupling is disclosed in FIGS. 3-5 and 7 and designated 37.

As has been referred to earlier herein the drill member 16 includes a tubular body section 17 the forward end of which is fixed to the drilling blade 22. Within the tubular section 17 is fixed by plug welds 38 or otherwise a concentric sleeve 39 at the trailing end of which is a pair of diametrally opposed, helical slots 40 which extend forwardly from the trailing end. Each of the slots terminates in a circumferential extension 41. Each extension forms a driving lug 42. There thus are formed two driving lugs 42 which are diametrally opposite one another.

The coupling means also includes the tubular extension 11 (FIG. 3) which is fixed to and projects forwardly of the leading drill stem member 9. The extension has an annular wall of such dimension as snugly, but rotatably, to be accommodated within the sleeve 39 so that the outer surface of the extension abuts the inner surface of the sleeve 17.

The leading or forward end of the leading drill stem member 9 has two helical slots 43 each of which overlies the extension 11 and extends rearwardly from the forward end of the member 9. Each of the slots 43 terminates at its trailing end in a circumferential extension 44. The extensions 44 form a pair of driving lugs 45 corresponding to the lugs 42 and which also are diametrally opposed to one another.

Figure 3:
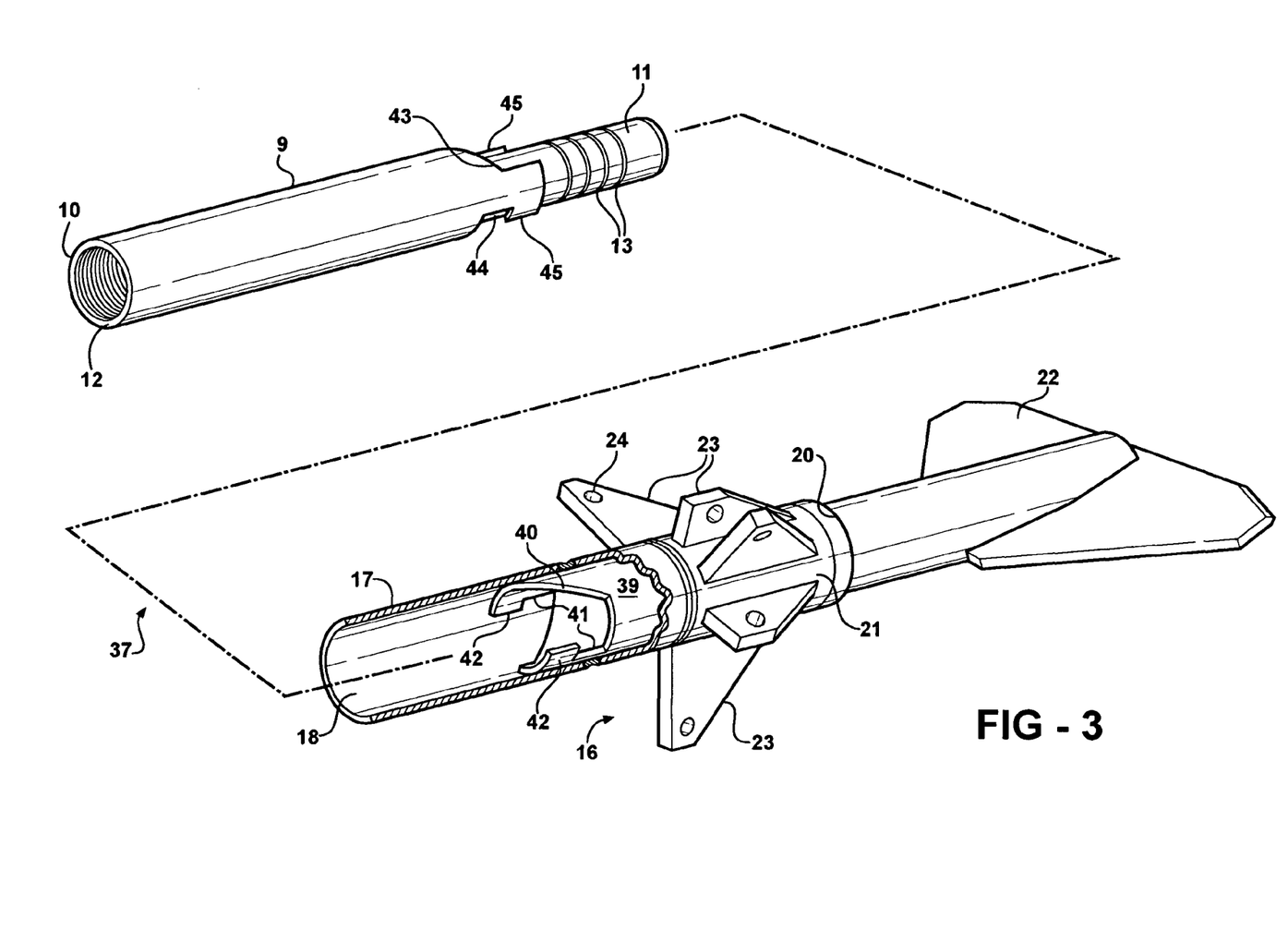
FIG. 3 is an isometric, exploded view, partly in section, of a coupling by means of which the drill member and the drill stem may be separably connected.
Figure 4:
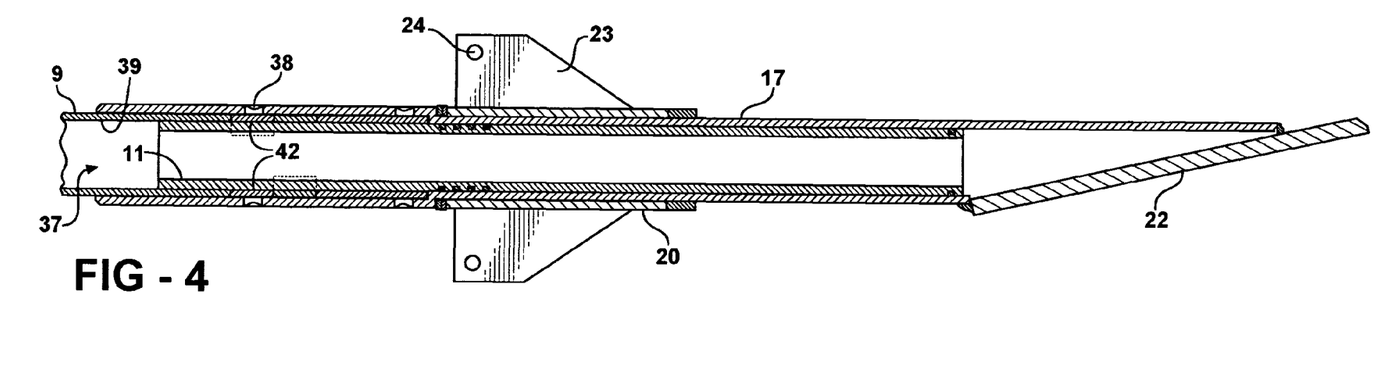
FIG. 4 is a fragmentary sectional view illustrating the drill stem and the drill member coupled to one another.

To couple the leading drill stem member 9 to the drill member 16, the tubular extension 11 is moved forwardly into the tubular member 17, as is indicated in FIG. 3. As forward movement of the leading drill stem member proceeds, the tubular extension 11 will enter the sleeve member 39 and the side edges of the helical slots 40 will be engaged by the side edges of the helical slots 43. Continued forward movement will result in engagement of the confronting sides of the slots 10 and 43 which function as cams to effect relative rotation of the extension 11 and the sleeve member 17 in such direction as to seat the driving lugs 45 of the extension 11 in the slot extensions 41 of the sleeve 39 and the driving lugs 42 of the sleeve 39 in the slot extensions 44 of the slot extensions 41. The driving lugs thus will be interlocked and the interlocking thereof occurs automatically in response to axial movement of the extension 11 into the sleeve 39.

The radial clearance between the extension 11 and the sleeve 17 corresponds to the wall thickness of the leading drill stem member 9. Accordingly, when the two pairs of driving lugs 42 and 45 are in interlocked condition, the lugs 42 and 45 will occupy the clearance and be sandwiched between the outer surface of the extension 11 and the inner surface of the sleeve 17, and both sets of driving lugs will be coplanar with the sleeve 39. The driving lugs 42 and 44 therefore will be precluded from either radially inward or outward movement, thereby providing a strong and stable drive coupling between the drill member 16 and the leading end 9 of the drill stem.

To uncouple the drill member from the drill stem, the latter is rotated in the opposite direction from that in which it is rotated during the forming of the underground passageway. The opposite direction rotation will enable the driving lugs 42 and 45 to move circumferentially enabling the helical edges at the sides of the slots to engage and by cam action effect rotary and axial movements of the drill stem in a direction rearwardly of the tubular sleeve 17 of the drill member 16, whereupon the drill stem member 9, including the sonde 14, may be withdrawn from the passageway 1, leaving the drill member and the conduit in the passageway.

Should there by any resistance to the uncoupling of the drill stem from the drill member because of a tendency of the latter to rotate with the drill stem, such resistance may be overcome by means of a radially extendible restraining assembly 47. The restraining assembly has pairs of bars 48 pivoted at the leading ends thereof to one of the brackets 23 forming arms terminating at their trailing ends in an outwardly and rearwardly inclined foot 49. The assemblies 47 normally lie parallel to the sleeve member 17 but when the drill member 16 is pushed forwardly into the earth via the drill stem, without being rotated, the drill member and the assemblies 47 will become embedded in the earth at a position somewhat beyond the passageway. This usually provides sufficient resistance to rotation of the drill member 16 to enable the leading end of the pipe stem to be rotated in a direction to uncouple the drill member from the drill stem. However, if more resistance to rotation of the drill member is required or desired, movement of the drill member rearwardly a short distance by the drill stem will cause the feet 49 of the restraining arms to engage and become embedded in the earth and effect radially outward movement of the arms into the earth.

The radially outward movement of the restraining arm assemblies effectively precludes rotation of the drill member and enables it to occupy a fixed position beyond the forward end of the passageway. When the drill member thus is immobilized its uncoupling from the drill stem is assured. When the restraining arms of the drill member are extended and embedded in the earth, the drill member provides a stable anchor for any cables or the like which may be secured to the drill member.

Figure 6:
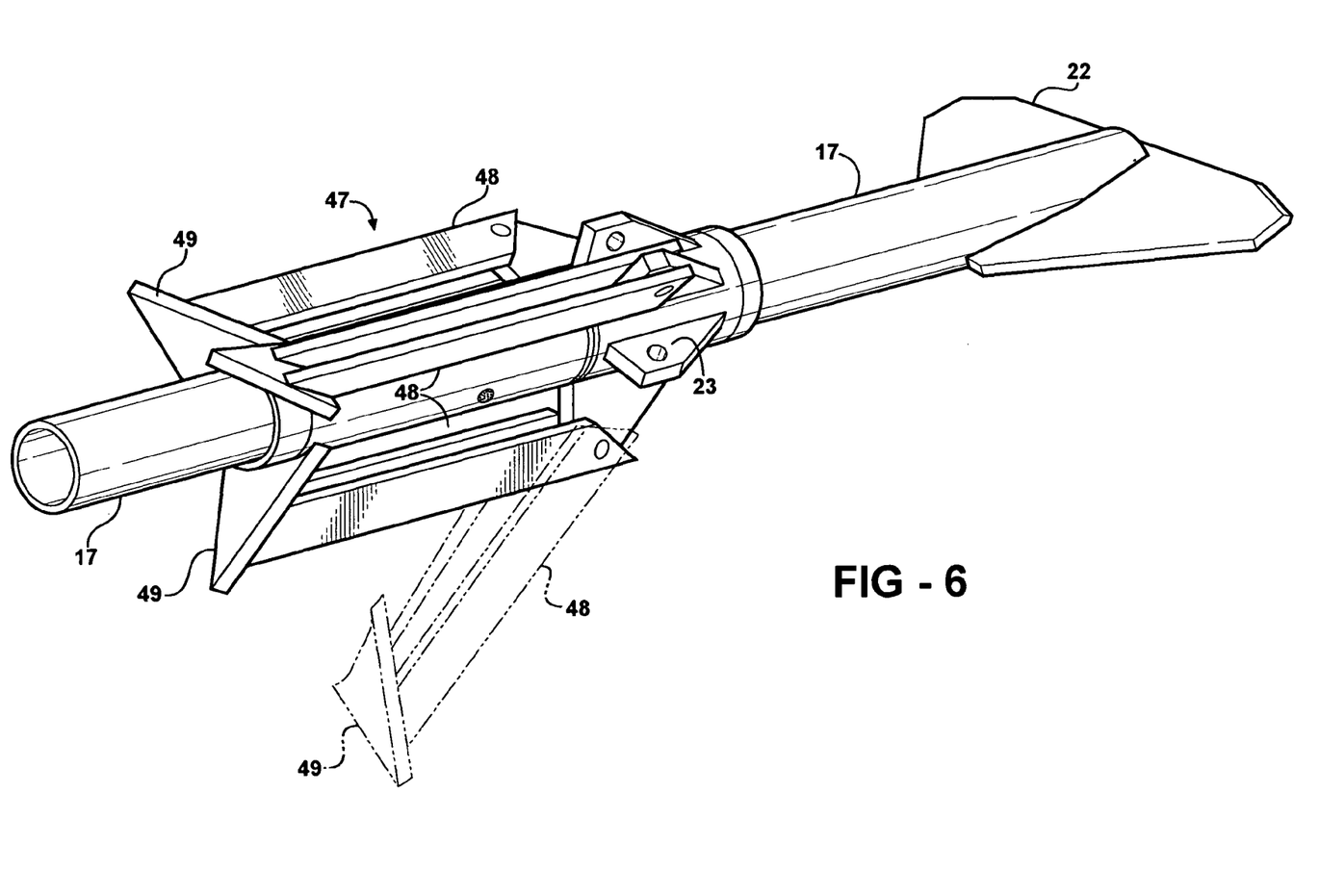
FIG. 6 is an isometric view of a drill member fitted with a rotatable bushing provided with brackets for attaching a conduit and/or cables and also illustrating pivoted anchor arms.
Figure 7:
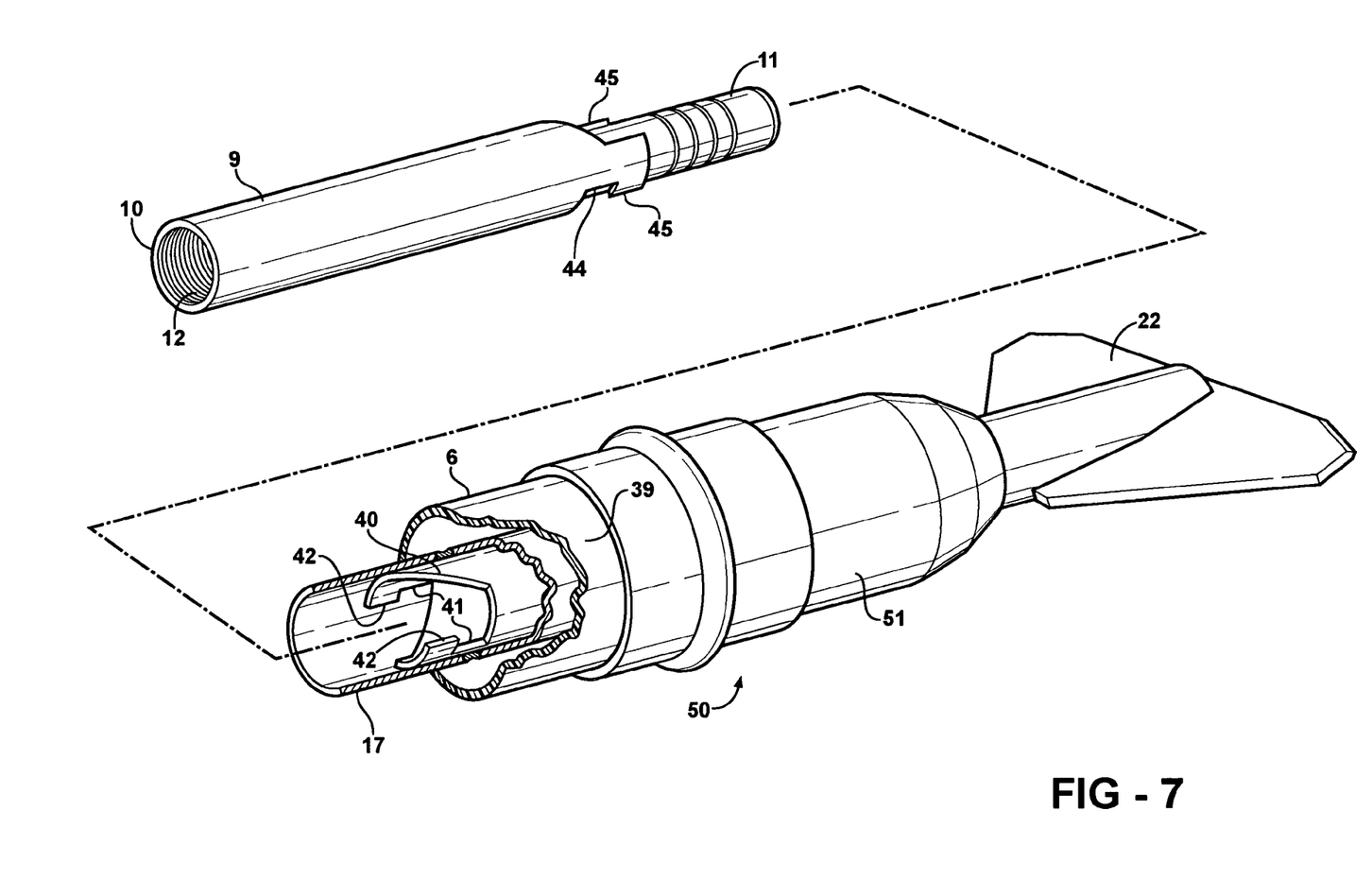
FIG. 7 is a view similar to FIG. 3 but illustrating a modified form for coupling the drill member to the leading end of a conduit.

A modified way of laying the conduit 5 in the passageway 1 as the latter is being formed is shown in FIG. 7 and comprises a pipe pull 50 of known construction having a rotary collar 51 journalled on the body 17 of the drill member 16 and fitted at its trailing end with a clamp 52 which encircles the body 17. The pipe pull is clamped to the leading end of the leading conduit pipe section 6. In this embodiment the joined sections of the conduit encircle and are coaxial with the drill stem, rather than lying alongside the drill stem. Otherwise, the means for coupling and uncoupling the drill stem to and from the drill member is the same as has been described. Although not shown in FIG. 6, restraining arms like the arms 48 may be mounted on the collar 51.

As has been set forth earlier herein, the apparatus and methods described enable the conduit 5 to be installed simultaneously with the formation of the underground passageway in marked contrast to conventional procedures in which the passageway is formed by drilling the passageway; disconnecting the drill member, usually by extending the forward end of the passageway upwardly to the surface or digging a pit at the position of the drill member in the passageway; uncoupling the drill member from the drill stem; connecting a reamer to the forward end of the drill stem; connecting one end of a conduit to the reamer; and recovering the drill stem and enlarging the diameter of the passageway by moving the drill stem and the reamer rearwardly to the beginning of the passageway. Since the conduit is connected at one end to the reamer, the conduit will be laid in the passageway as the drill stem and reamer are withdrawn therefrom by rearward traverse of the pipe stem.

In the use of the apparatus and methods according to the invention the forward end of the passageway need not be returned to the surface, no pit need be excavated, no reamer is required, and no separate operation is required to install the conduit in the passageway. Moreover, not only is it possible to install the conduit in the passageway during the formation thereof, but it also is possible to lay other elongate members, such as cables, in the passageway simultaneously with the conduit or in lieu thereof.

If the site is to be dewatered, water can flow from the site into the conduit 5 via openings in the perforated pipe sections and be pumped from the conduit by a pump at the inlet end of the passageway, as is conventional.

In some instances it may be desirable to direct fluid (either liquid or gas) from the conduit 5 into the site. This may be done for the purpose of clearing any ports in the pipe sections which may have become clogged. In addition, various kinds of known microbes or other bioremedial substances may be pumped through the conduit and into the site for the treatment of toxic material. Further, cool or heated air may be discharged from the conduit at the site.

Figure 5:
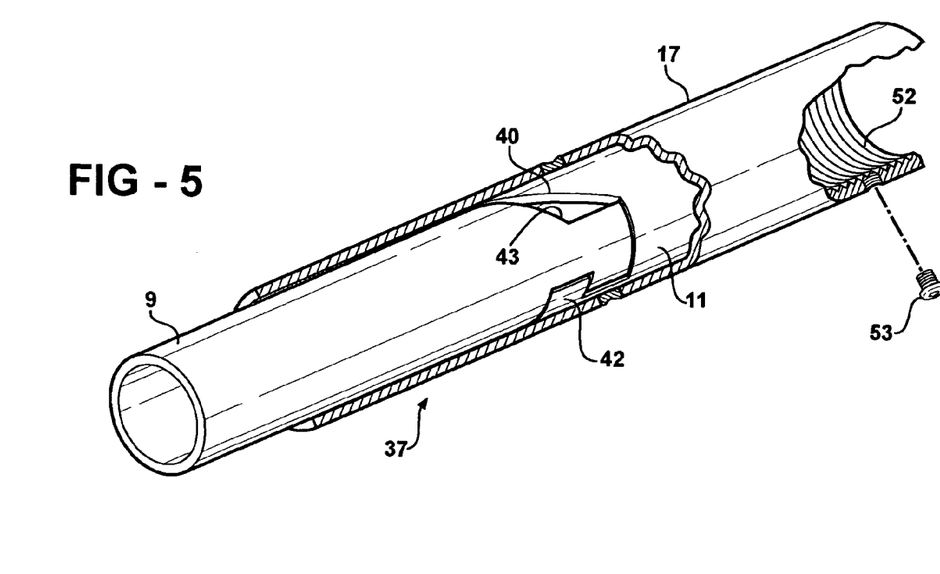
FIG. 5 is a fragmentary, isometric view, partly in section, and illustrating the coupling in condition to be coupled to a drill member or any other device.

Although it may be preferable to form the drill member 16 as an integral part of the rotary sleeve 17, it is not necessary to do so. As is indicated in FIG. 5, the leading end of the sleeve 17 may be threaded interiorly, as shown at 52, or exteriorly so as to be separably coupled to a correspondingly threaded section of the drill member or any other device which it may be desired to couple to the drill stem. If desired, the leading end of the threaded sleeve 17 may be fixed by a set screw 53 to the adjacent end of the part accommodated in the sleeve 17 at its leading end.

This disclosure is representative of presently preferred methods and apparatus according to the invention, but is intended to be illustrative rather than definitive thereof. The invention is defined in the claims.

We claim:

1. A method of installing a conduit below ground level comprising connecting a rotary and linearly movable drill member to rotatable driving means;

rotating said driving means and said drill member thereby simultaneously rotating and linearly moving said drill member in a direction to form an underground passageway; and non-rotatably coupling a conduit to said drill member for moving said conduit linearly along said passageway in said direction in response to the linear movement of said drill member, disconnecting said rotatable driving means from said drill member following the formation of the passageway to a selected length, removing said rotatable driving means from said passageway through said passageway in the opposite direction, and leaving said drill member and said conduit in said passageway.

2. A method of installing a fluid conduit underground comprising securing a rotary drill member to one end of a rotatable drill stem; rotating and linearly moving said drill stem and said drill member to form an underground passageway of selected diameter; and connecting one end of said fluid conduit to said drill member for linear movement therewith, said passageway being of such cross sectional size as simultaneously to accommodate said drill member, said drill stem, and said fluid conduit, disconnecting said drill stem from said drill member following the formation of the passageway to a selected length underground, removing said drill stem from said passageway through said passageway, and leaving said drill member and said fluid conduit in said passageway.

3. The method according to claim 2 including forming said conduit by telescoping an inner tube within an outer tube.

4. The method according to claim 3 including forming radially extending openings in each of said inner and outer tubes, and adjusting the relative positions of said inner and outer tubes to enable said openings in said inner tube to move into a selected position of adjustment relative to the openings in said outer tube.

5. The method according to claim 4 including adjusting said inner and outer tubes by relative rotation thereof.

6. The method according to claim 4 including adjusting said inner and outer tubes by relative axial movement thereof.

\* \* \* \* \*